United States Patent
Yoon et al.

(10) Patent No.: US 7,570,880 B2
(45) Date of Patent: Aug. 4, 2009

(54) AUTO FOCUS CONTROL APPARATUS FOR CAMERA MODULE

(75) Inventors: Young-Kwon Yoon, Anyang-si (KR); Seong-Ha Park, Suwon-si (KR); Doo-Sik Shin, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 475 days.

(21) Appl. No.: 11/399,866

(22) Filed: Apr. 7, 2006

(65) Prior Publication Data

US 2006/0257131 A1 Nov. 16, 2006

(30) Foreign Application Priority Data

May 13, 2005 (KR) .................. 10-2005-0039940

(51) Int. Cl.
*G03B 3/10* (2006.01)
*G03B 13/34* (2006.01)
*G03B 17/00* (2006.01)
*H04N 5/225* (2006.01)
*G02B 7/02* (2006.01)

(52) U.S. Cl. .................. 396/133; 396/75; 348/340; 348/342; 348/345; 359/824; 359/826

(58) Field of Classification Search .................. 396/133, 396/75; 348/236, 249, 250, 272, 294, 298, 348/340, 347, 342, 345; 359/811, 819, 823, 359/824, 826, 829, 830
See application file for complete search history.

(56) References Cited

U.S. PATENT DOCUMENTS 7,411,625 B2 * 8/2008 Lee et al. .................. 348/361
2005/0129384 A1 * 6/2005 Nishida et al. .............. 385/147

FOREIGN PATENT DOCUMENTS

| JP | 03-107103 | 5/1991 |
|----|-----------|--------|
| JP | 08-094905 | 4/1996 |
| JP | 10-254019 | 9/1998 |
| JP | 11-072693 | 3/1999 |
| JP | 11-175996 | 7/1999 |
| JP | 2001-051179 | 2/2001 |
| JP | 2003-270694 | 9/2003 |
| JP | 2004-194223 | 7/2004 |
| JP | 2004-280031 | 10/2004 |
| JP | 2005-107008 | 4/2005 |
| KR | 2004-100457 | 12/2004 |

* cited by examiner

*Primary Examiner*—Rochelle-Ann J Blackman
(74) *Attorney, Agent, or Firm*—Cha & Reiter, LLC

(57) ABSTRACT

A miniaturized auto focus control apparatus for camera module includes: a sensor assembly having an image sensor mounted to a printed circuit board and an infrared filter provided on an upper portion of the image sensor; a lens housing to which a plurality of permanent magnets mounted to an upper portion of the sensor assembly are mounted; a coil mounted into the lens housing; a lens barrel to which a plurality of focus control lenses are mounted in the direction of an optical axis; a lens guide portion integrally provided in the lens housing and engaged on the outer side of the lens barrel to guide the lens barrel so that the lens barrel is moved linearly upward and downward in the direction of the optical axis according to electric fields of the coil and the permanent magnets.

13 Claims, 9 Drawing Sheets

AUTO FOCUS CONTROL APPARATUS FOR CAMERA MODULE

CLAIM OF PRIORITY

This application claims priority to an application entitled "Auto Focus Control Apparatus for Camera Module," filed with the Korean Intellectual Property Office on May 13, 2005 and assigned Serial No. 2005-39940, the contents of which are incorporated herein by reference.

BACKGROUND OF THE INVENTION

1. Field of the Invention

The present invention generally relates an auto focus control apparatus for a camera module, and more particularly to an auto focus control apparatus for a camera module which can provide excellent preview image quality prior to shooting and/or editing an image after acquisition.

2. Description of the Related Art

Camera modules for performing image recognition functions in devices, such as, for example, a video camera, an electronic still camera, a PC camera terminal, a camera phone, and the like are known in the art.

As the size of camera modules and camera screens have become increasingly miniaturized with the development of high density technology, various miniaturized camera modules are now available to allow users to manually photograph subjects without support equipment such as tripods. Moreover, miniaturization has enabled the camera modules to be mounted directly to video phones, thereby providing a user with the capability of taking photographs while speaking on the phone.

As is well known in the art, a camera module forms an image on an image sensor surface which is a component of a lens optical system. The characteristics of a lens optical system are such that images are transferred to the image surface in a reliable manner without distortion.

The position of the image surface of a lens optical system is changed according to the distance between a lens and a subject. A high quality picture can only be obtained when the degree of variation in the position of the image surface relative to the position of a subject is within the focal range of the camera. However, even a camera module having a deep focal range cannot focus on multiple subjects at staggered distances from the camera module.

Therefore, an auto focus control apparatus capable of controlling the relative position of a lens and a sensor according to the distance between the camera module and a subject is provided in the camera module which can photograph the subject at a short distance and includes a micro function for photographing an image without distortion.

Auto focus control apparatuses of camera modules include actuators capable of changing the position of lenses and sensors. Driving methods of such auto focus control apparatuses includes the use of a stepping motor, a voice coil motor, a piezoelectric motor, and the like.

The stepping motor method and the voice coil motor method have been used in devices such as digital cameras and camera phones. The voice coil motor method is primarily used in a camera phone requiring only an auto focus control apparatus function without an optical zoom function.

The voice coil motor method uses Lorentz forces generated by inductive magnetic forces of coils in magnetic fields formed by permanent magnets for linear movement, and is suitable for precise linear movement over a short distance.

FIG. 1 illustrates a conventional auto focus control apparatus 1 of a camera module which uses the voice coil motor method. As shown in FIGS. 1-3, a cylindrical lens housing 2 is shown extended in a lengthwise direction. A lens barrel 3 is shown mounted in the direction of an optical axis A1. A plurality of focus control lenses 3a are shown mounted along the optical axis A1. A coil 4 is wound along the circumference of the lens barrel 3 in the direction of the optical axis A1. A yoke 5 to which permanent magnets 5a are mounted, to interact with the coil 4, is provided on the outer circumferential side of the lens barrel 3. Resilient members 6 are provided on the lower side of the lens barrel 3 for providing resilient forces so that the lens barrel 3 can be moved, in a linear fashion, in the direction of the optical axis A1. In FIG. 2, the lens housing 2 is shown mounted to the upper portion of a sensor assembly 7.

Referring to FIG. 2, the sensor assembly 7 includes a printed circuit board 7a, an image sensor 7b which is a pickup device attached to the printed circuit board 7a, and an infrared filter 7c provided above the image sensor 7b. The lower end surface of the printed circuit board 7a is electrically connected to a flexible printed circuit board (FPCB).

As shown in FIGS. 2 and 3, when an exciting current is applied to the coil 4 of the lens barrel 3, an electromagnetic force is generated in the magnetic fields of the permanent magnets 5a, causing the lens barrel 3 to move upward and downward, in a linear fashion, in the direction of the optical axis A1. The electromagnetic force is proportional to the strength of the applied current. Therefore, by regulating the strength of the applied current, the position of the lens barrel 3 is regulated to control the focus of the lenses 3a.

The lens barrel 3 is engaged with the lens housing 2 to regulate the focus of the lenses 3a during the process of assembling the lens barrel 3 to the lens housing 2. The focus height is regulated by engaging the lens housing 2 with the sensor assembly 7 by rotating the lens housing 2 to regular the focus of the lenses during the process of assembling the lens housing 2 in which the lens barrel 3 is installed to the sensor assembly 7.

One drawback associated with the conventional voice coil motor method, described above, is that since the auto focus control apparatus regulates the focus by rotating a screw to regulate the lens focus height initially, the size of the camera module increases. A further drawback is the time required to regulate the focus initially, primarily due the fact that the focus height cannot be regulated precisely. That is, since the focus height is regulated manually by an operator, it is difficult to regulate the focus height accurately. In this state, the lens housing 2 is engaged with an upper portion of the sensor assembly 7 by a screw rotation portion. Furthermore, in the case where the focus is not regulated properly by removing the screw rotating portion, the quality of the preview image deteriorates.

A further drawback is the inability to miniaturize the camera module due to the conventional coil being wound on the outer circumferential side of the lens barrel in the optical axis direction, thereby increasing the thickness of the camera module.

SUMMARY OF THE INVENTION

Accordingly, the present invention has been made to solve the above-mentioned problems occurring in the prior art, by providing an auto focus control apparatus for a camera module having miniaturized dimensions resulting in a slim profile and can provide high quality preview images prior to shooting and/or editing an image after acquisition.

According to one aspect, an auto focus control apparatus for a camera module is provided which can decrease the thickness of the camera module, thereby miniaturizing and slimming the camera module. Miniaturization is achieved by removing the need for a screw portion of a lens barrel by integrally forming a coil holder portion for winding a coil in the direction perpendicular to an optical axis.

The auto focus control apparatus of the invention preferably includes: a sensor assembly having an image sensor mounted to a flexible printed circuit board; an infrared filter provided on an upper portion of the image sensor; a lens housing to which a plurality of permanent magnets are mounted to an upper portion; an underside of the permanent magnets being further attached to an upper portion of a sensor assembly; a coil mounted into the lens housing; a lens barrel to which a plurality of focus control lenses are mounted in the direction of an optical axis; a lens guide portion integrally provided in the lens housing and engaged on the outer side of the lens barrel to guide the lens barrel so that the lens barrel is moved linearly upward and downward in the direction of the optical axis according to electric fields of the coil and the permanent magnets; a lens stopper unit for mounting the lens barrel to the lens housing so that the lenses are separated from the sensor by a predetermined distance along the direction of the optical axis to secure the initial resolution of the lenses; and at least one lens resilient means provided on an upper end surface of the lens barrel to maintain the distance for securing the initial resolution of the lenses when the lens barrel is engaged with the lens housing and to provide a resilient force so that the lens barrel is moved linearly upward and downward.

DETAILED DESCRIPTION

Figure 1:
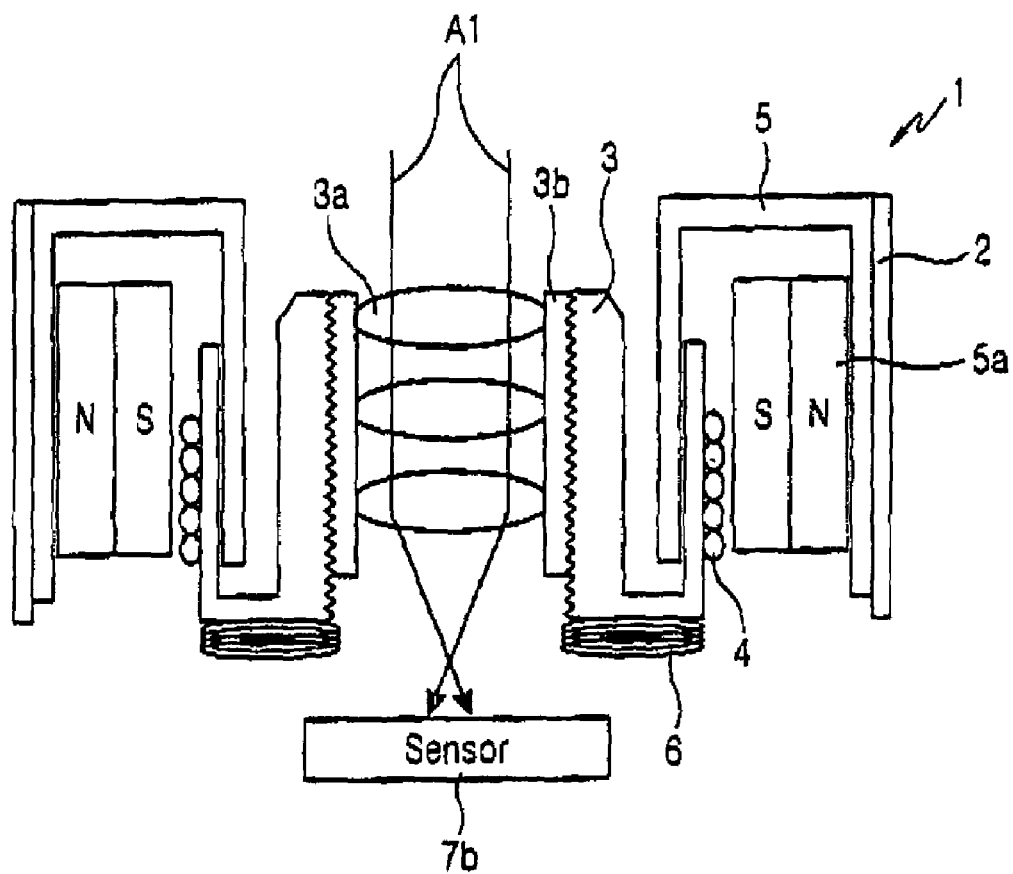
FIG. 1 is a side view for showing a conventional auto focus control apparatus of a camera module, according to the prior art.
Figure 2:
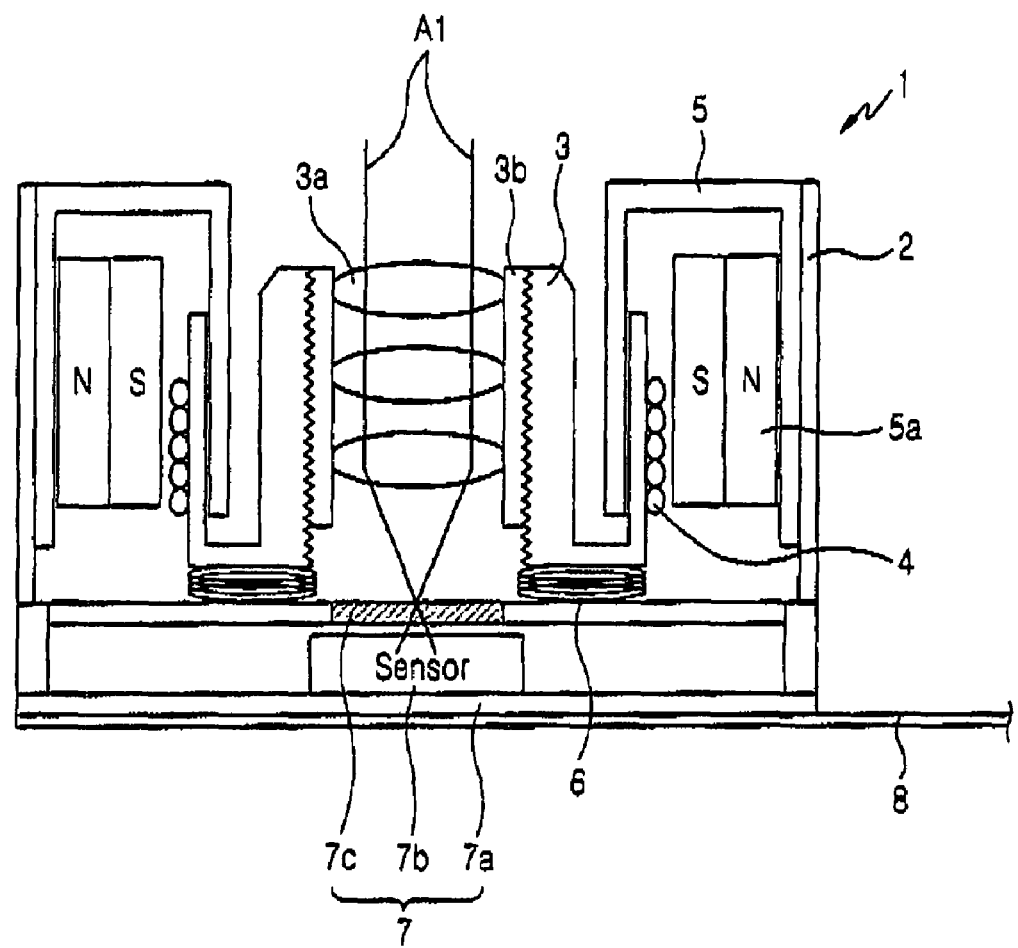
FIG. 2 is a side view for showing the engagement state of a conventional auto focus control apparatus of a camera module, according to the prior art.
Figure 3:
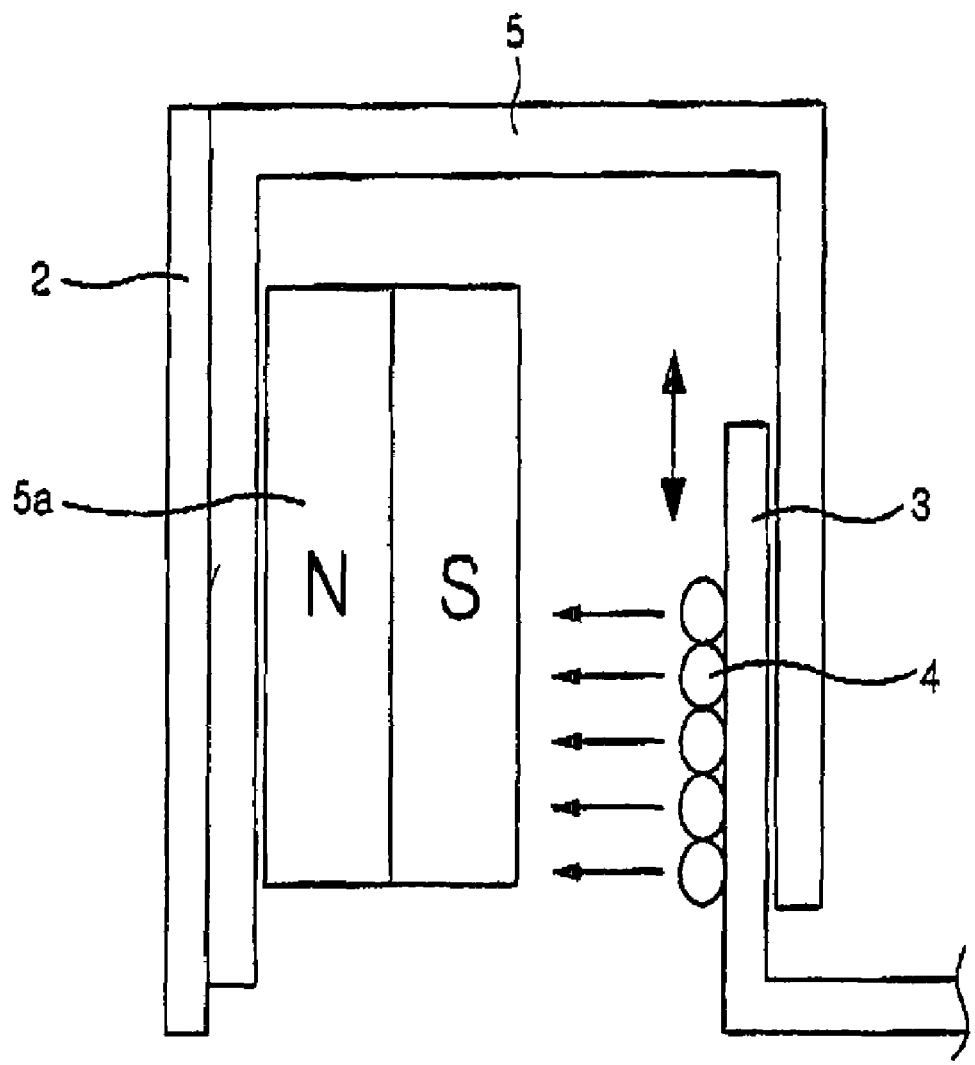
FIG. 3 is a side view for showing the operational state of a conventional auto focus control apparatus of a camera module, according to the prior art.

Hereinafter, an embodiment of the present invention will be described with reference to the accompanying drawings.

An embodiment of the auto focusing control apparatus in accordance with the present invention is described with reference to the drawings in FIGS. 4-9.

As illustrated in FIGS. 4-9, the auto focusing control apparatus 10 includes a sensor assembly 7 (see FIGS. 4 and 8), a lens barrel 3 (see FIGS. 4, 5, 8 and 9) mounted to an upper portion of the sensor assembly 7 in the direction of an optical axis A1, to which a plurality of focus control lenses 3a (see FIGS. 5, 8 and 9) are mounted in the direction of the optical axis A1, at least one coil holder portion 30 (see FIGS. 4 and 5), a lens guide portion 40 (see FIGS. 4 and 6-9), a lens stopper unit 50 (see FIG. 4), and at least one lens resilient means 70 (see FIGS. 4-9).

A plurality of permanent magnets 21 (see FIGS. 4 and 6-9) are mounted on the inner side of the lens housing 20 in a orientation perpendicular to the optical axis A1. The permanent magnets 21 are responsive to a magnetic field generated by an exciting coil 31 (see FIGS. 4, 5 and 7-8) wound on the coil holder portion 30 (see FIGS. 4 and 5).

The coil holder portion 30 (see FIGS. 4 and 5) protrudes from the lens barrel 3 in a direction perpendicular to the optical axis A1 proximal to the permanent magnets 21. The coil holder portion 30 (see FIGS. 4 and 5) is formed at an outer portion of the lens barrel 3 so that the exciting coil 31 is wound in the direction perpendicular to the optical axis A1.

The lens guide portion 40 defining a displacement chamber for the lens barrel 3 and is integral to the lens housing 20 to guide the lens barrel 3. The lens barrel 3 experiences a bi-directional linear movement whenever a current is supplied to the coil 31, electromagnetic fields are generated by the coil 31 to cause the permanent magnets 21 to generate an electromotive force to move the lens barrel 3 upward and downward in the direction of the optical axis A1.

Figure 4:
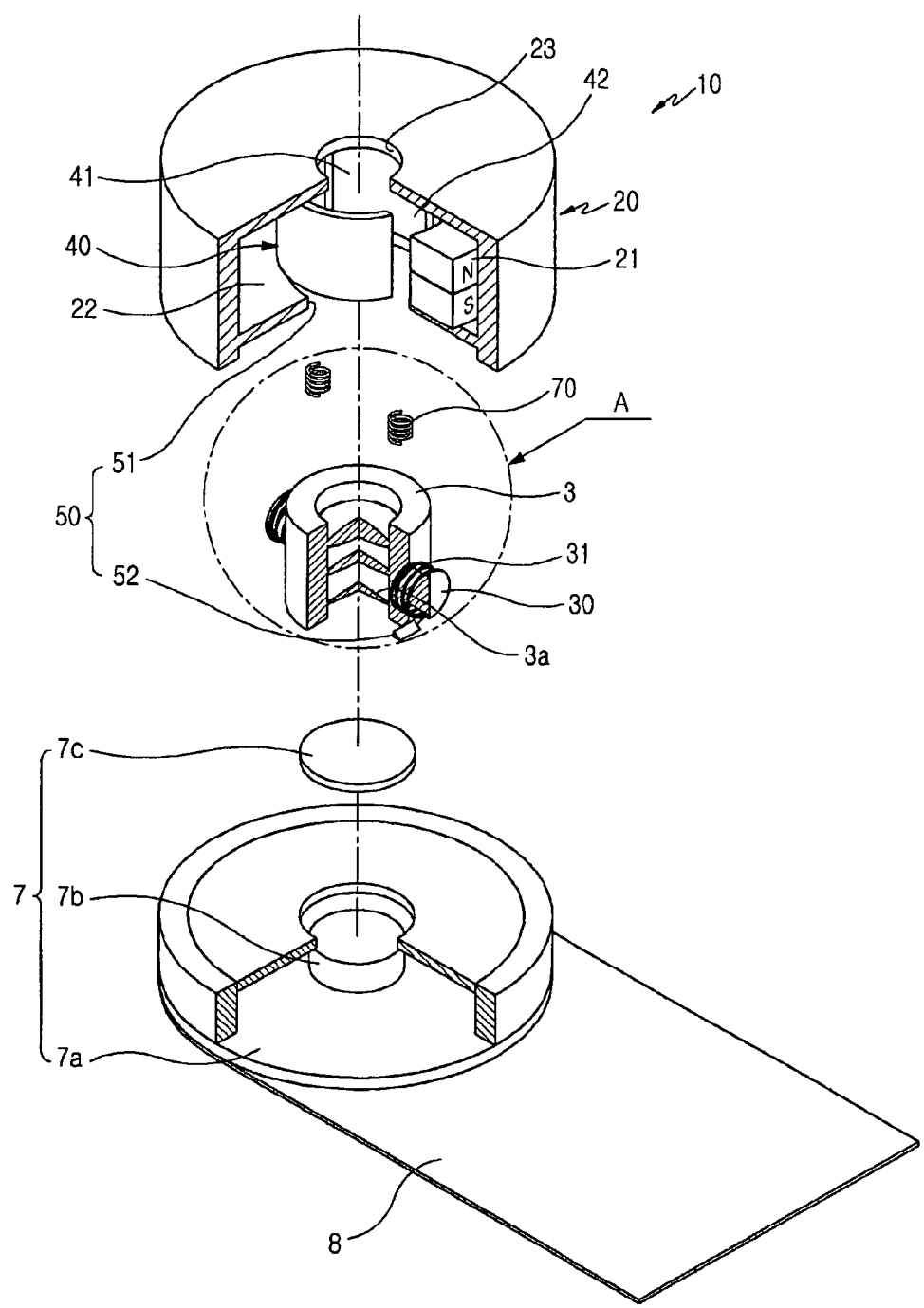
FIG. 4 is an exploded perspective view for showing an auto focus control apparatus of a camera module according to an embodiment of the present invention.

The lens stopper unit 50, formed in the lens housing 20 in the direction of the optical axis A1, mounts the lens barrel 3 to the lens housing 20 so that the lens 3a is separated from a sensor 7b by a predetermined distance L1 in the direction of the optical axis A1 to secure an initial resolution of the lens 3a. A lens resilient means 70, comprised of a coil spring, is provided on the upper end surface of the lens barrel 3 to further assist in maintaining the distance L1 for securing the initial resolution of the lens 3a when the lens barrel 3 is engaged with the lens housing 20 and to provide a resilient force as the lens barrel 3 is moved linearly upward and downward. That is, the lens resilient means are for maintaining the distance L1 to secure the initial resolution of the lenses when the lens barrel is engaged with the lens housing, and to provide a resilient force so that the lens barrel is moved linearly upward and downward. A lens hole 23 is formed in the upper end surface of the lens housing 20. FIG. 4 shows a lens receiving space 22 defined by the lens housing 20 and the lens guide portion 40. The lens receiving space 22 for sequentially engaging the lens barrel 3, the coil holder portion 30, the lens guide portion 40, and the lens stopper unit 50 is formed in the lens housing 20 in the direction of the optical axis A1. As shown in FIG. 4, the lens guide portion 40 has a cylindrical shape for engagement with the lens barrel 3. The lens guide portion 40 forms a volume 41 on the inner side of the lens guide portion 40 to accommodate linear movement of the lens barrel 3.

Figure 6:
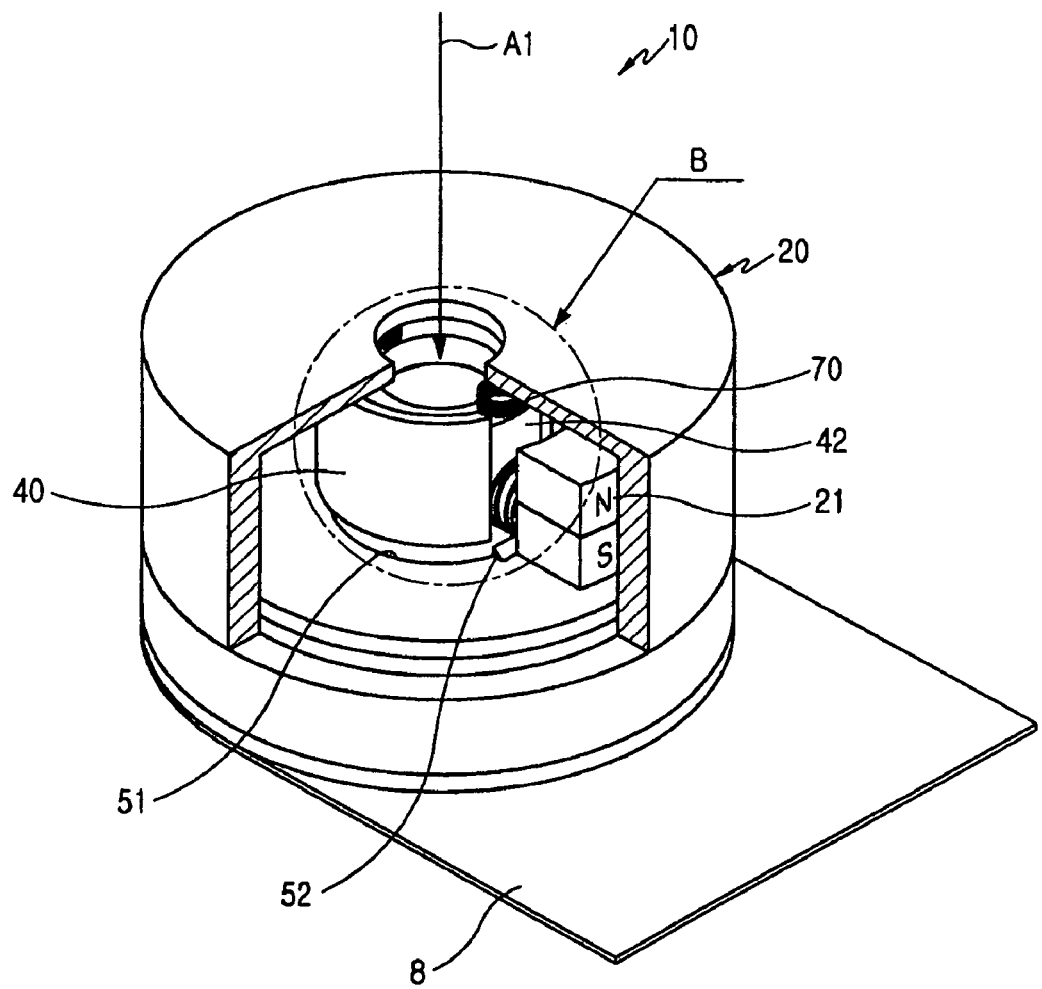
FIG. 6 is a partial cut-away perspective view for showing the engagement state of an auto focus control apparatus of a camera module according to an embodiment of the present invention.
Figure 7:
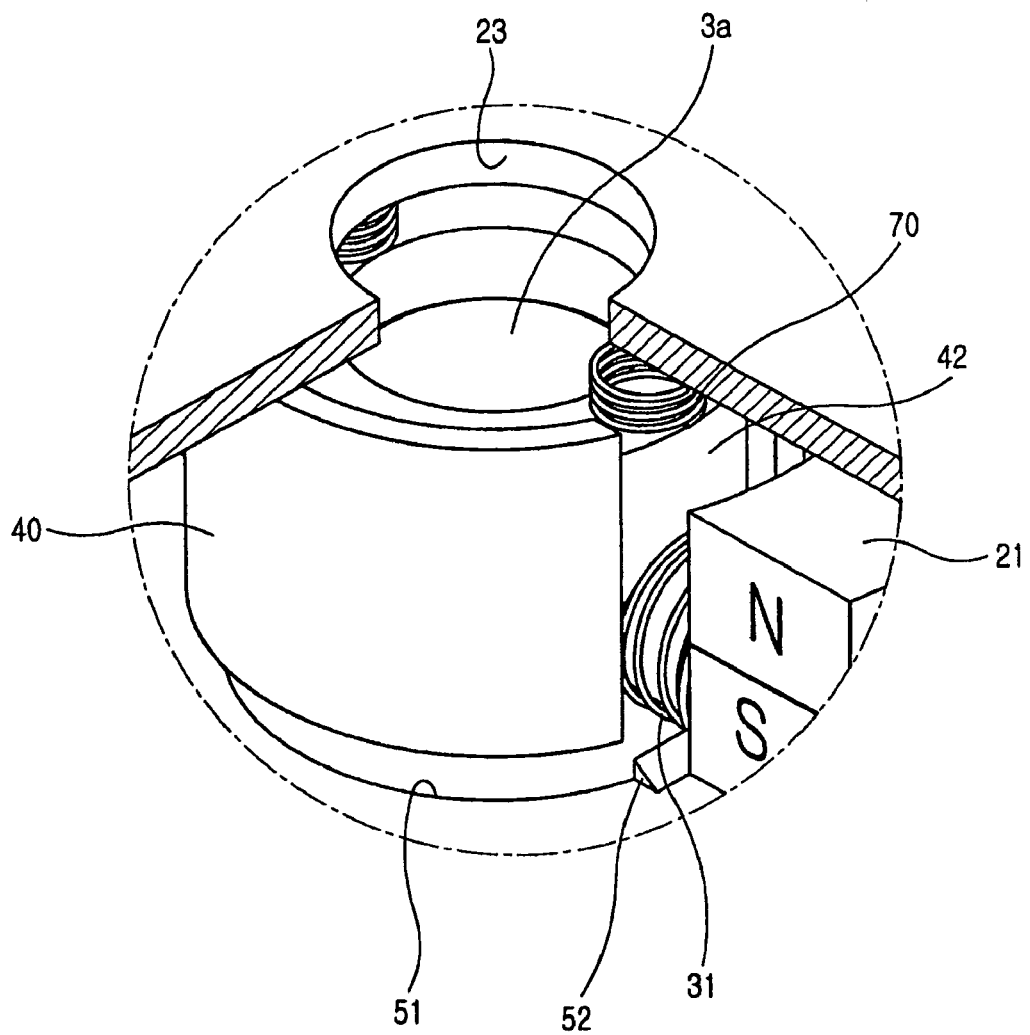
FIG. 7 is an enlarged partial cut-away perspective view for showing portion B of FIG. 6.

As shown in FIGS. 4, 6 and 7, at least one guide hole 42 is formed in the lens guide portion 40 in the direction of the optical axis A1 to serve as a guide for the proper positioning of the coil holder portion 30 and the lens stopper unit 50. The lens resilient means 70 includes a coil spring.

As shown in FIGS. 4-7, the lens stopper unit 50 includes a stopper member 51 (see FIG. 7) and at least one stopper locker 52. The stopper member 51 is formed in the lens housing 20 and is engaged with the lower portion of the lens barrel 3 when making contact with the stopper locker 52 which is configured to extend through and become engaged/disengaged with the stopper member 51. The stopper locker 52 protrudes from an outer circumferential portion of the lower surface of the lens barrel 3 to engage the stopper member 51 at a position at which the lens 3a can secure its initial resolution.

The stopper member 51 includes a catching hole to receive the stopper locker 52 so as to engage the lens barrel 3 with the lens housing 20. The stopper locker 52 is in the form of an inclined surface for easy insertion into the catching hole.

Figure 8:
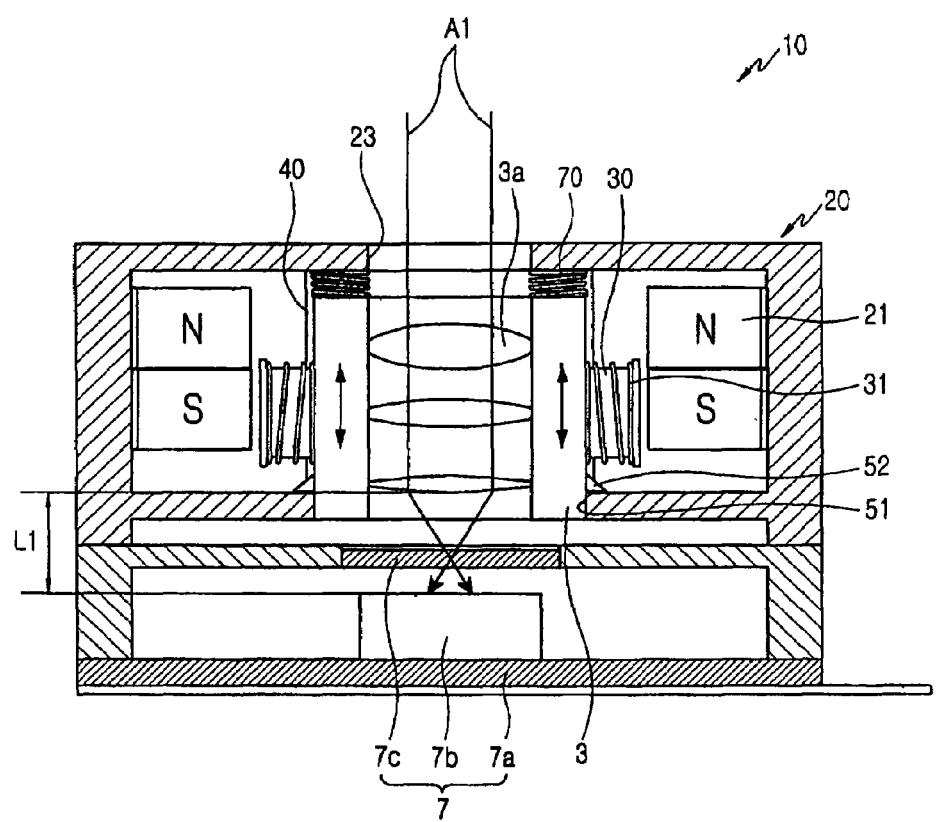
FIG. 8 is a side sectional view for showing the operational state of an auto focus control apparatus of a camera module according to an embodiment of the present invention.
Figure 9:
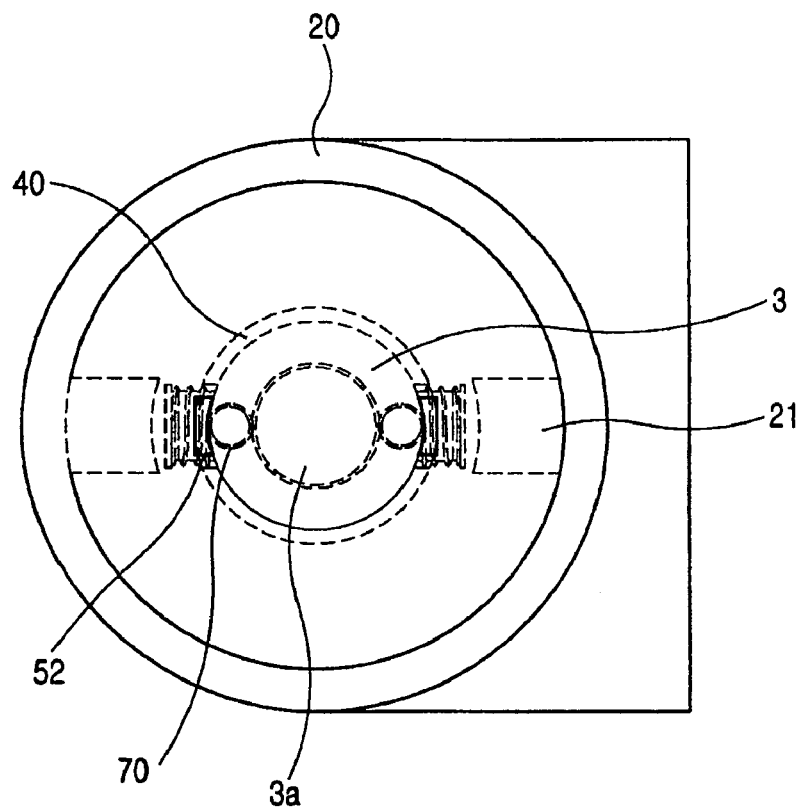
FIG. 9 is a plain view for showing the operational state of an auto focus control apparatus of a camera module according to an embodiment of the present invention.

As shown in FIG. 8, the distance L1 between the image sensor 7b and the lens 3a is within a tolerance of 30 to 200 micrometers from an optimum position so that an initial image resolution of excellent quality is secured.

Hereinafter, the operation of the auto focus control apparatus 10 of a camera module according to an embodiment of the present invention will be described in detail with reference to FIGS. 4 to 9.

Figure 5:
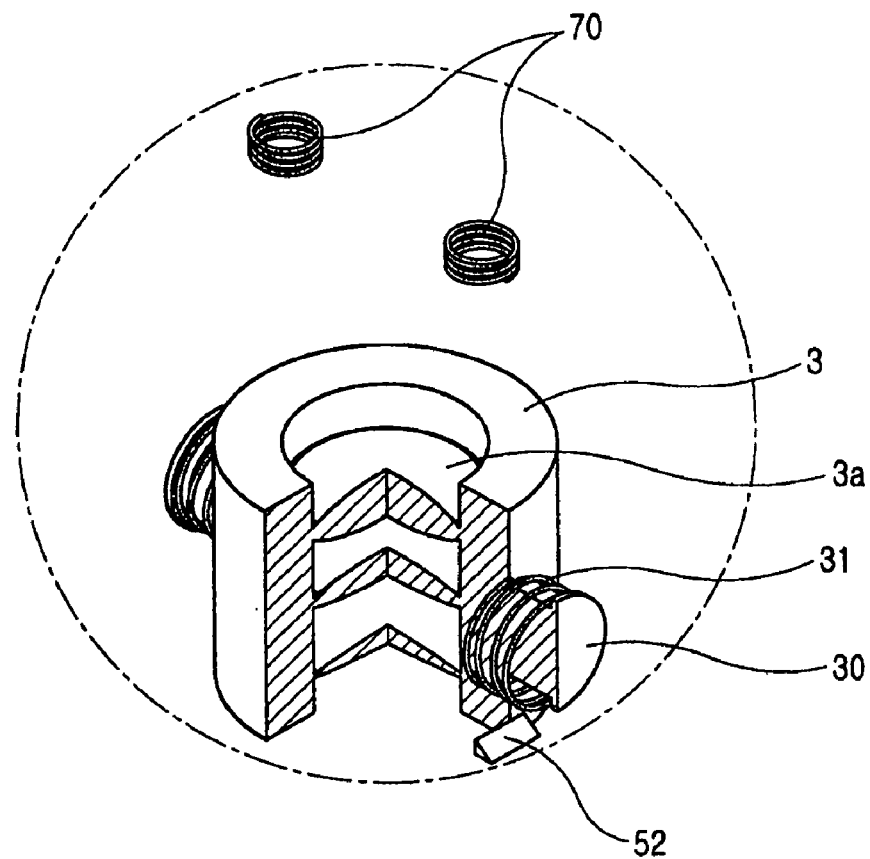
FIG. 5 is an enlarged perspective view for showing portion A of FIG. 4.

As shown in FIGS. 4, 5 and 8, a plurality of focus control lenses 3a are mounted to the lens barrel 3. A plurality of permanent magnets 21 are mounted to the inner side of the lower portion of the lens housing 20.

The lens guide portion 40 has a cylindrical shape. A barrel movement space 41 is formed on the inner side of the lens guide portion 40 to accommodate the lens barrel 3 to accommodate the upward and downward linear movement of the lens barrel 3. The lens guide portion 40 guides the lens barrel 3 so that the lens barrel 3 can move linearly up and down in the direction of the optical axis A1. The direction of movement is determined by the magnetic fields of the coil 31 and the permanent magnets 21 provided at the outer circumferential portion of the lens barrel 3.

FIGS. 6 and 7, illustrates a protruding coil holder portion 30 for providing an exciting magnetic force to the permanent magnets 21. The protruding coil holder portion 30 is shown as having an orientation perpendicular to the optical axis A1. The protruding coil holder portion 30 is integrally formed with the lens barrel 3 at the outer circumferential portion of the lens barrel 3. The coil holder portion 30 of the lens barrel 3 is engaged so as to be proximal to the permanent magnets 21 (see FIGS. 4 and 6-9) mounted into the lens housing 20 when the lens barrel 3 is mounted into the lens housing 20.

A guide hole 42 (see FIG. 7) is formed in the lens guide portion 40 in the direction of the optical axis A1. The coil holder portion 30, formed in the lens barrel 3, engages the guide hole 42 so as to be guided by the guide hole 42.

As shown in FIGS. 4 and 8, the lens barrel 3 is engaged with the stopper member 51 formed in the lens housing 20. The stopper locker 52 protrudes from the outer circumferential portion of the lens barrel 3 and extends through and is thereby engaged with the stopper member 51. The lens barrel 3 is mounted to the lens housing 20, at two places, with the lens 3a separated from the sensor 7b by the distance L1 along the direction of the optical axis A1 to secure the initial resolution of the lens 3a. The distance L1 between the image sensor 7b and the lens 3a is within a tolerance of 30 to 200 micrometers of an optimum position to secure a superior initial image resolution quality.

As shown in FIGS. 4 to 7, the lens resilient means 70 is provided on the upper end surface of the lens barrel 3 to maintain the distance L1 for securing the initial resolution of the lens 3a when the lens barrel 3 is engaged with the lens housing 20 and to provide a resilient force so that the lens barrel 3 is moved linearly upward and downward.

The process of initially regulating the focus of the lens when the camera module is assembled can be omitted by engaging the stopper member 51 of the lens housing 20 with the stopper locker 52 of the lens barrel 3.

Further, if the camera module is turned on, the focus is regulated to some degree by the stopper member 51 of the lens housing 20 and the stopper locker 52 of the lens barrel 3. In this manner, the focus regulation can provide a level of resolution required by a mobile terminal.

The camera module requires an initial resolution of more than 200 lines which can be obtained during manufacture by regulating the relative positions of the lens and the sensor. Thereafter, if a subject is photographed at a position securing the initial resolution of more than 200 lines by operating the auto focus control apparatus, an image of excellent quality can be obtained.

By installing the lens in the housing of the camera module at a position which secures the initial resolution of the lens at more than 200 lines, an image of excellent quality can be obtained in a preview state of the camera module.

While an auto focus control apparatus of a camera module according to the invention has been shown and described with reference to a certain embodiment thereof and accompanying drawings, it will be understood by those skilled in the art that various changes in form and details may be made therein without departing from the spirit and scope of the invention as defined by the appended claims.

What is claimed is:

1. An auto focus control apparatus of a camera module, the auto focus control apparatus comprising:
   a sensor assembly having an image sensor, wherein the image sensor is mounted on a flexible printed circuit board;
   an infrared filter provided on an upper portion of the image sensor;
   a lens housing to which a plurality of permanent magnets are mounted on an inner wall, the plurality of magnets being further mounted to an upper portion of the sensor assembly;
   a coil mounted in the lens housing;
   a lens barrel;
   a plurality of focus control lenses mounted to the lens barrel in a direction of an optical axis;
   a lens guide portion integral to the lens housing and providing a displacement chamber for guiding the lens barrel to guide the lens barrel linearly in the direction of the optical axis, responsive to an electromagnetive force sourced from electric fields of the coil and the plurality of permanent magnets;
   a lens stopper unit for mounting the lens barrel to the lens housing for separating the lenses from the sensor by a predetermined distance in the direction of the optical axis to secure an initial resolution of the lenses; and
   at least one lens resilient means provided on an upper end surface of the lens barrel for maintaining a distance (L1) to secure the initial resolution of the lenses and for providing a resilient force to ensure linear movement of the lens barrel;
   at least one coil holder portion protruding in a direction perpendicular to the optical axis proximal to the permanent magnets and formed at an outer portion of the lens barrel, wherein said coil is wound around said coil holder portion in a direction perpendicular to the optical axis (A1).

2. An auto focus control apparatus according to claim 1, wherein a lens receiving space is defined by the lens housing and the lens guide portion, and wherein a lens hole is formed in an upper end surface of the lens housing.

3. An auto focus control apparatus according to claim 1, wherein the lens guide portion is cylindrical thereby forming a barrel movement space on the inner side of the lens guide portion to accommodate linear movement of the lens barrel.

4. An auto focus control apparatus according to claim 1, wherein at least one guide hole is formed in the lens guide portion in the direction of the optical axis (A1) to guide the coil holder portion and the lens stopper unit.

5. An auto focus control apparatus according to claim 1, wherein the lens resilient means includes a coil spring.

6. An auto focus control apparatus according to claim 1, wherein the lens stopper unit includes:
   a stopper member formed in the lens housing and engaged with the lower portion of the lens barrel to receive and restrict the lens barrel; and
   a stopper locker protruding from an outer circumferential portion of the lens barrel, the stopper locker contacts with and extends through the stopper member to hold the stopper member at a position allowing the lens to secure an initial resolution of the lenses.

7. An auto focus control apparatus according to claim 6, wherein the stopper member has a catching hole through which the stopper locker extends, so that the stopper locker is caught and restricted by the catching hole.

8. An auto focus control apparatus according to claim 6, wherein the stopper locker includes an inclined surface to facilitate extension through the stopper member.

9. An auto focus control apparatus according to claim 1, wherein the lens stopper unit restricts the movement of the lens barrel in the lens guide portion to within a predetermined range.

10. An auto focus control apparatus according to claim 1, wherein a distance L1 between the image sensor and the lens is within a tolerance of 30 to 200 micrometers of an optimum distance.

11. An auto focus control apparatus of a camera module, the auto focus control apparatus comprising:
    a sensor assembly having an image sensor mounted on a flexible printed circuit board and an infrared filter provided on an upper portion of the image sensor;
    a lens housing to which a plurality of permanent magnets are mounted, the plurality of magnets being further mounted to an upper portion of the sensor assembly;
    a lens barrel to which a plurality of focus control lenses are mounted and having at least one coil holder protruding from the lens barrel perpendicular to an optical axis;
    a coil mounted in the lens housing arranged in a direction perpendicular to an optical axis and along an outer portion of the barrel;
    a lens stopper unit for mounting the lens barrel to the lens housing so that the lenses are separated from the sensor by a predetermined distance along the direction of an optical axis to secure the initial resolution of the lenses; and
    at least one lens support means provided in the lens barrel to engage the lenses at positions for securing the initial resolution of the lenses when the lens barrel is engaged with the lens housing and to support the lens barrel.

12. An auto focus control apparatus of a camera module according to claim 11, further comprising a lens guide portion integral to the lens housing and engaged on the outer side of lens barrel to guide the lens barrel so that the lens barrel is moved linearly upward and downward in the direction of the optical axis according to electric fields of the coil and the permanent magnets.

13. An auto focus control apparatus of a camera module according to claim 11, wherein the lens support means includes a resilient member.

* * * * *